UNITED STATES PATENT OFFICE.

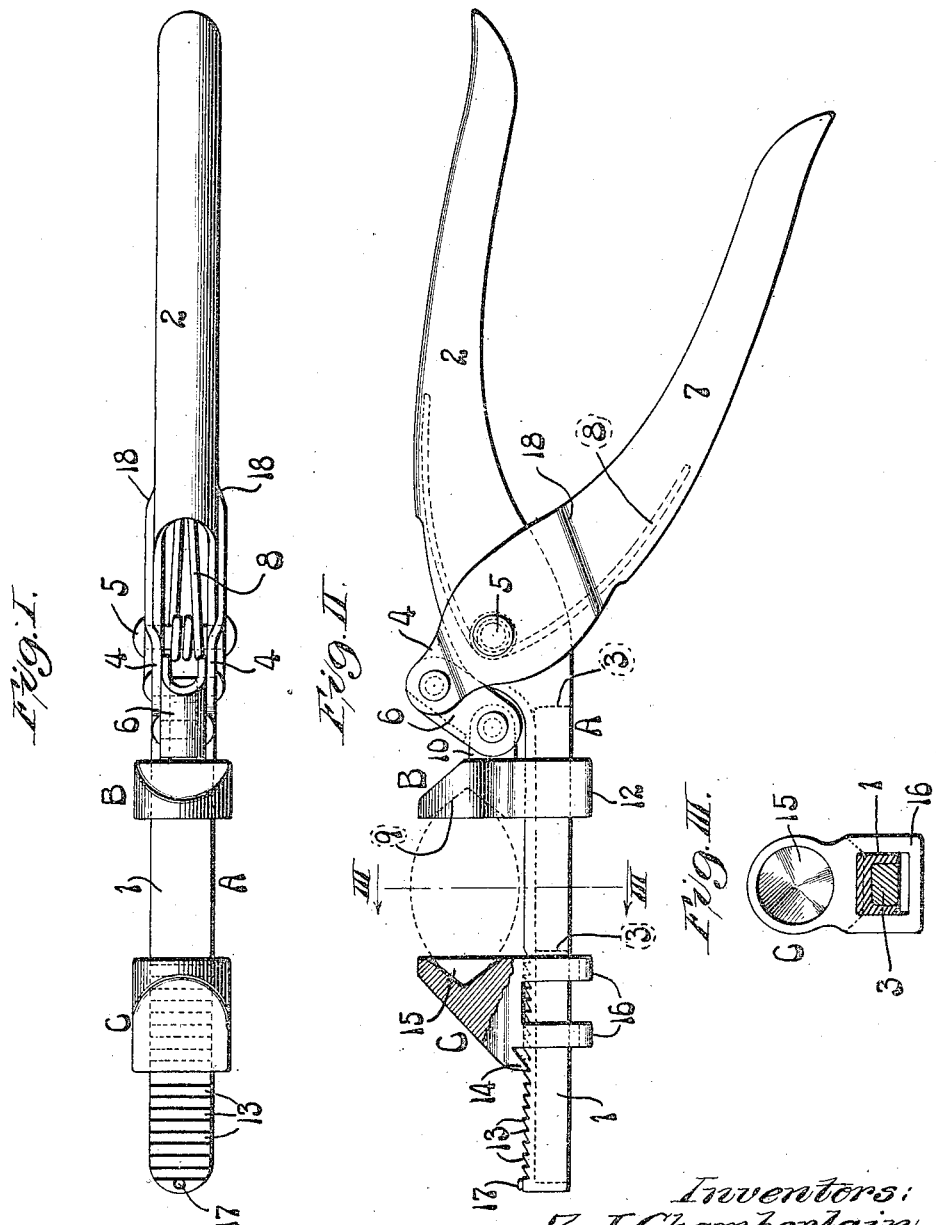

ZEAR J. CHAMBERLAIN AND FRANK LOW, OF ST. LOUIS, MISSOURI.

NUTCRACKER.

1,254,119.     Specification of Letters Patent.     Patented Jan. 22, 1918.

Application filed September 18, 1915. Serial No. 51,381.

*To all whom it may concern:*

Be it known that we, ZEAR J. CHAMBERLAIN and FRANK LOW, citizens of the United States of America, residents of the city of St. Louis, State of Missouri, have invented certain new and useful Improvements in Nutcrackers, of which the following is a full, clear, and exact description, reference being had to the accompanying drawings, forming part of this specification.

Our invention relates to improvements in nut cracking devices, one of the objects being to produce a strong and simple nut cracker having its elements so constructed and arranged that the power for cracking the nuts may be obtained at the expense of very little labor on the part of the operator. To accomplish this, the preferred form of the invention includes a movable jaw slidably fitted to a jaw holder and a toggle connecting said movable jaw to an operating handle extending from said toggle. These different parts are so arranged that the leverage obtained by transmitting power from the operating handle and through the toggle, to the movable jaw, enables the device to be operated very easily.

Another object is to produce a nut cracker having an operating device, a nut-receiving jaw movable by said operating device, and a compensating jaw adapted to be adjusted by hand and then locked to secure a nut between the jaws, said operating device being adapted to move a fixed distance after the compensating jaw has been adjusted to secure the nut, thus providing for the reception of nuts of different sizes, and enabling the operator to impart a predetermined cracking movement to each nut irrespective of its length.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claim hereunto appended.

Figure I is a plan view of a nut cracker constructed in accordance with the invention.

Fig. II is a side elevation.

Fig. III is a section on line III—III, Fig. II.

A designates a jaw holder comprising an elongated jaw receiving member 1 and a handle 2 extending from said jaw receiving member. To illustrate the preferred form of the invention we have shown a channel shaped jaw receiving member reinforced by a filler 3 which lies between the downturn flanges of the channel shaped member. A nut-receiving jaw B is slidably fitted to the member 1 of the jaw holder, and connected to said jaw holder by means of a toggle consisting of a pair of short toggle arms 4, pivoted at 5 to the jaw holder, and a toggle link 6 connecting said toggle arms 4 to the jaw B. 7 designates an operating handle extending from and integrally connected to the toggle arms 4. A restoring spring 8 coiled around the pivot member 5 and engaging the handles 2 and 7, tends to move said handles away from each other.

The jaw B has a head provided with a nut-receiving pocket 9 and a rearwardly projecting lug 10 extending from said head, said lug being pivoted to the toggle link 6. A loop 12, forming part of the jaw B, surrounds the jaw receiving member 1 at a point where the latter is reinforced by the filler 3.

A compensating jaw C is slidably fitted to the jaw receiving member 1 in such a manner that it may be adjusted toward or away from the jaw B and then secured to retain the nut between said jaws, as indicated by dotted lines in Fig. II. In accordance with the preferred form of the invention the jaw receiving member 1 is provided with a row of ratchet teeth 13 and the jaw C has a tooth 14 adapted to coöperate with any one of said ratchet teeth to secure the compensating jaw on the jaw holder. The compensating jaw is also provided with a nut-receiving pocket 15 and a pair of loops 16 embracing jaw receiving member 1. 17 designates a retaining pin secured to jaw receiving member 1 to prevent the compensating jaw from accidentally dropping from said member 1.

Obviously, the compensating jaw C may be very easily and quickly adjusted by hand, and then locked to secure a nut between the jaws as indicated by dotted lines.

In this connection it will be noted that the compensating jaw C is loosely fitted to the elongated member 1, and that said jaw will drop by gravity when the device is held in an upright position. Therefore, the nut may be held in engagement with the jaw B by the fingers of the operator, and the device may then be turned to an upright position to permit jaw C to drop into engagement with the nut. The jaw C will then automatically interlock with one of the teeth 13 when the device is restored to a horizontal position as shown in Fig. II. After the nut has been secured, the handles 2 and 7 are moved toward each other, thus actuating the toggle members 4 and 6 to slide the jaw B toward the jaw C. The handle 7 is offset at 18; the offset portions are adapted to engage the handle 2 to limit the operative movement of the device. In cracking the nuts, the handles 2 and 7 may be moved toward each other until the offset portions 18 engage the handle 2, thereby moving the jaw B a fixed distance. Inasmuch as the compensating jaw C may be adjusted to secure nuts of different sizes between the jaws, and since the jaw B may be moved a fixed distance after the nut has been secured, the device is adapted to impart a predetermined cracking movement to each nut, irrespective of the length of the nut.

We claim:

A nut cracker comprising a U-shaped jaw-receiving member, having a rearwardly extending handle, a reinforcing filler in said jaw-receiving member, a compensating jaw mounted on the jaw-receiving member, a sliding jaw mounted on the jaw-receiving member, an operating handle pivoted to the rearwardly extending handle, and a link pivoted at one end to the sliding jaw and at its other end to the said handle.

ZEAR J. CHAMBERLAIN.
FRANK LOW.

Witnesses:
EFFIE D. PINKERTON,
JAMES M. BRECKENRIDGE.

Copies of this patent may be obtained for five cents each, by addressing the "Commissioner of Patents, Washington, D. C."